(12) United States Patent
Moreno-Aparicio

(10) Patent No.: US 7,275,454 B2
(45) Date of Patent: Oct. 2, 2007

(54) SYSTEM FOR THE CONVERSION OF A RECTILINEAR SWAYING MOTION INTO A ROTATING MOTION AND VICE VERSA

(76) Inventor: Manuel Moreno-Aparicio, Playa de Benicasin, 37, Boadilla del Monte (ES)

( * ) Notice: Subject to any disclaimer, the term of this patent is extended or adjusted under 35 U.S.C. 154(b) by 137 days.

(21) Appl. No.: 11/124,981

(22) Filed: May 9, 2005

(65) Prior Publication Data

US 2005/0193842 A1    Sep. 8, 2005

Related U.S. Application Data

(60) Division of application No. 10/287,749, filed on Nov. 4, 2002, now abandoned, which is a continuation-in-part of application No. 09/856,931, filed as application No. PCT/ES99/00376 on Nov. 23, 1999, now abandoned.

(30) Foreign Application Priority Data

Nov. 30, 1998    (ES)    .................................... 9802508

(51) Int. Cl.
*F16H 21/16*    (2006.01)
(52) U.S. Cl. ........................ 74/57; 123/197.1
(58) Field of Classification Search .................... 74/56, 74/57; 123/197.1, 197.2, 197.3
See application file for complete search history.

(56) References Cited

U.S. PATENT DOCUMENTS

| | | | |
|---|---|---|---|
| 2,508,253 | A | 5/1950 | Haggardt |
| 3,388,603 | A | 6/1968 | Clark |
| 5,161,491 | A | 11/1992 | Graves |

FOREIGN PATENT DOCUMENTS

| | | |
|---|---|---|
| DE | 2 206 458 | 8/1973 |
| EP | 581 975 A1 | 2/1994 |
| FR | 2 264 187 | 10/1975 |

*Primary Examiner*—William C. Joyce
(74) *Attorney, Agent, or Firm*—Adams Evans P.A.

(57) ABSTRACT

A grooved cylinder (2) is alternatively mobile in two opposing cylinder guides (10, 11) mounted on a crankcase (14). This cylinder (2) is mounted coaxially inside a double crown piece of revolution (5) with an indented portion (6a) to rotate around the axis (2a) of the cylinder (2) over bearings (B2) coupled between a third groove (16) of the respective crankcase cover (14a, 14b) and the respective housing (9) of the external bases of the ends (6) of the crown (5); these cylinder (2) and crown (5) are coupled by means of bearings (B1) placed between a first groove in zigzag (3) in the side surface of the cylinder (2) and the first housings (8) in the inside of the crown (5), and other bearings (B1) placed between some straight grooves (4), also on the side surface of the cylinder (3) extending between its ends and the valleys (3a) of the first groove (3), and third housings (15) provided in the respective crankcase cover (14a, 14b).

8 Claims, 14 Drawing Sheets

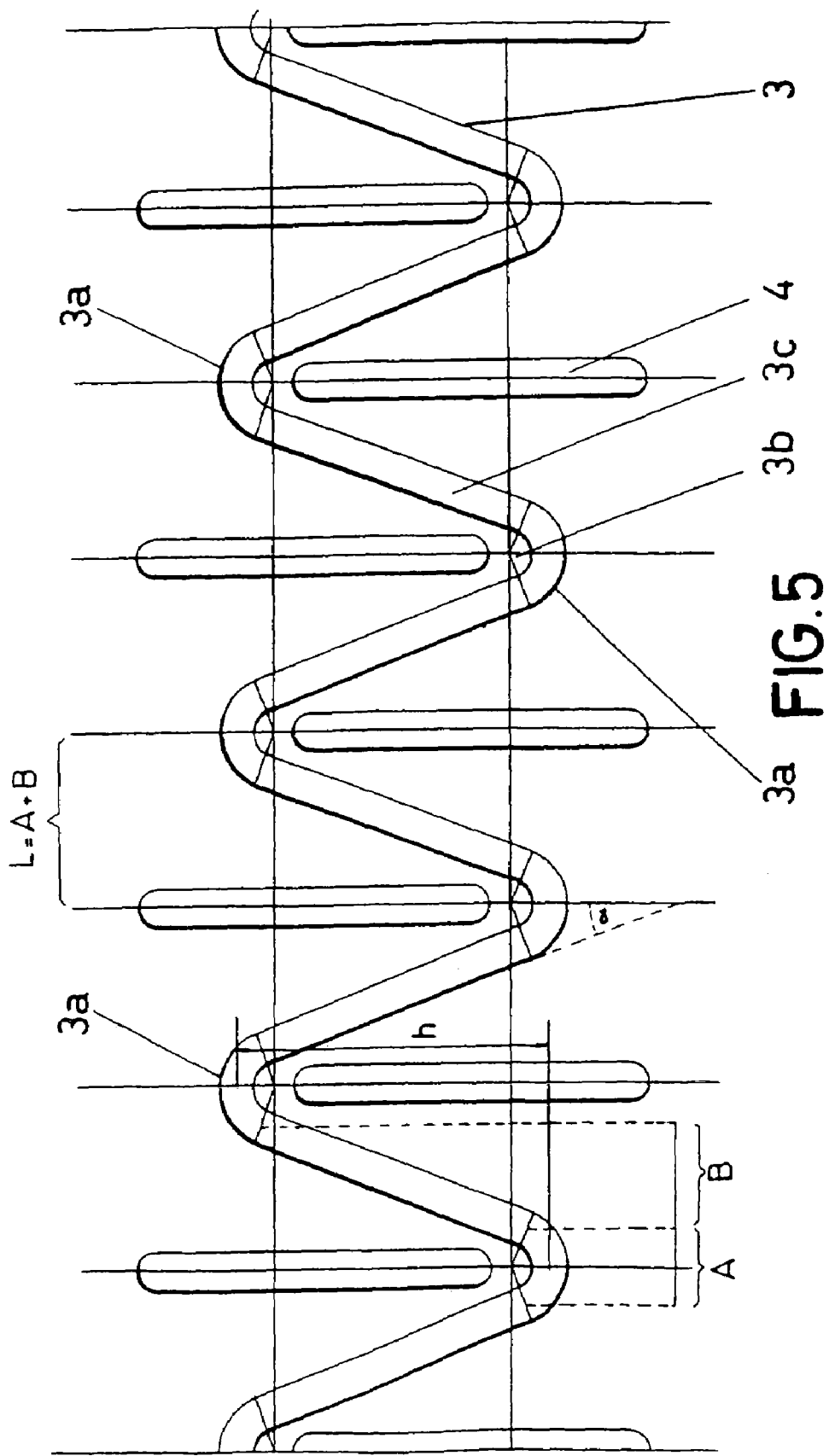

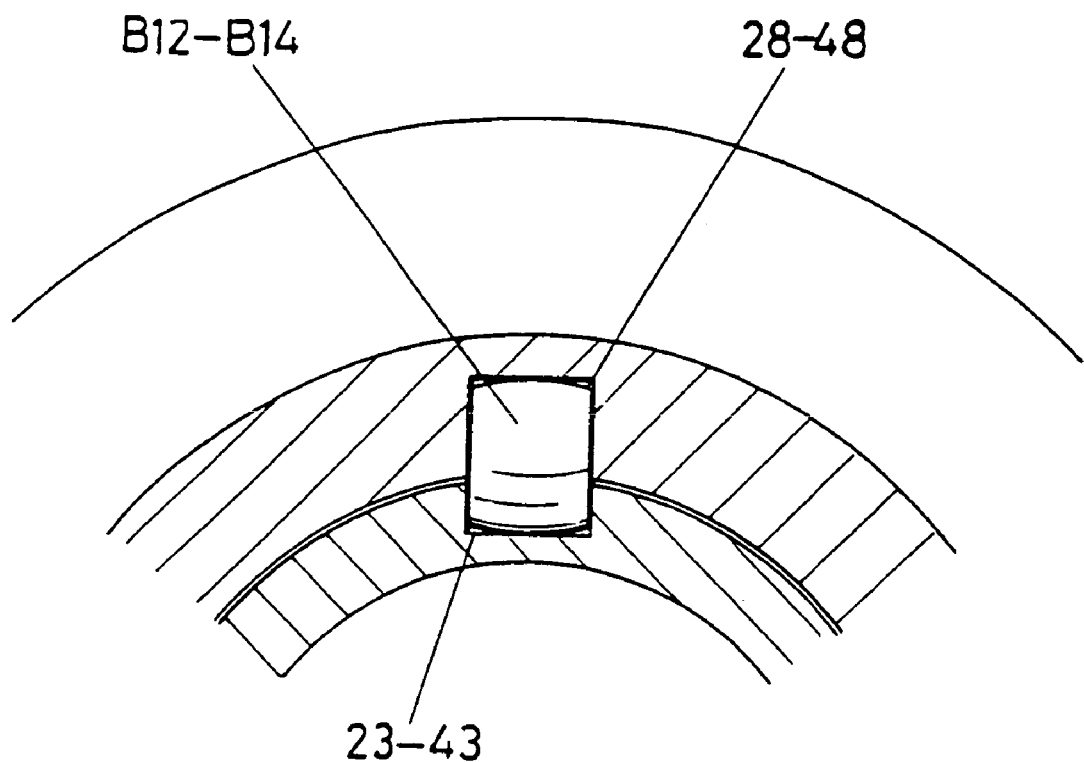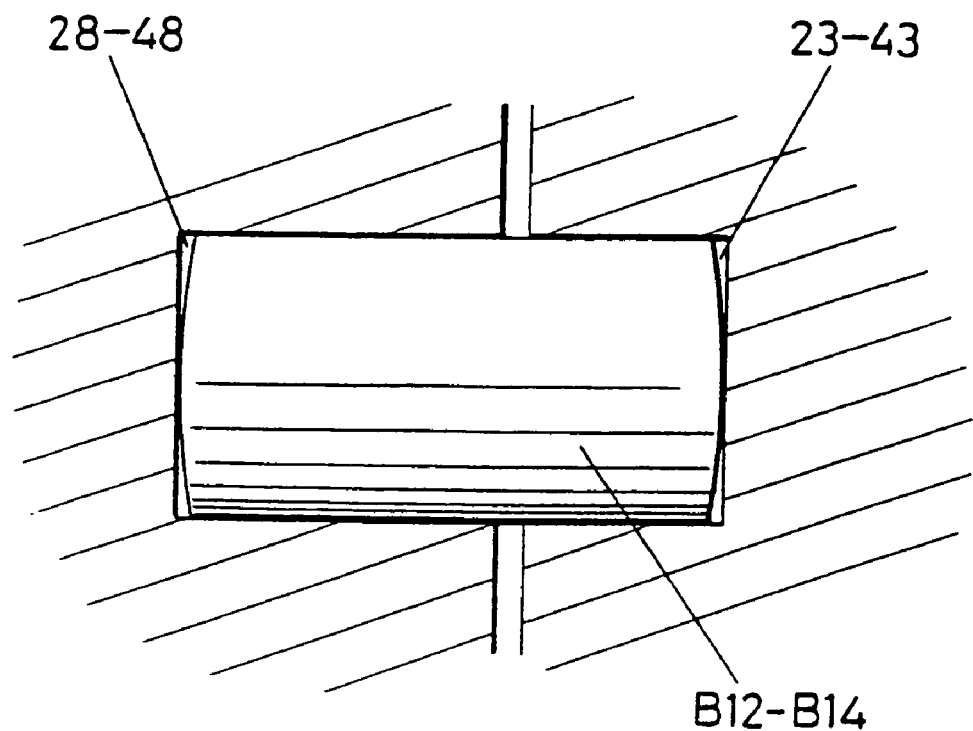
FIG. 12A

SYSTEM FOR THE CONVERSION OF A RECTILINEAR SWAYING MOTION INTO A ROTATING MOTION AND VICE VERSA

This application is a divisional of U.S. application Ser. No. 10/287,749, filed Nov. 4, 2002 now abandoned, which is a continuation-in-part of U.S. application Ser. No. 09/856,931, filed Aug. 10, 2001 now abandoned, which is the National Stage of International Application No. PCT/ES99/00376, filed Nov. 23, 1999, now abandoned.

TECHNICAL FIELD AND BACKGROUND OF INVENTION

The present invention refers to a system for transforming an oscillating or reciprocating rectilinear motion of a constant amplitude into a rotating motion with a single turning direction and vice versa, according to the characteristics of the first claim.

The transformation or conversion of a reciprocating rectilinear motion into a rotating one has an application in all types of machines and engines, whether these operate by steam, pneumatics, electromagnetic pull, internal combustion, horse haulage, etc. The so-called connecting rod-handle system is the only one employed in a general manner, and for example, for internal combustion engines it is known as a connecting rod crankshaft system.

As is well-known by those skilled in the art, this connecting rod-crankshaft system that is widely used in explosion engines, owes its low performance to the angles of incidence of the connecting rod on the crankshaft that are only adequate in a short sector of the operation cycle. To palliate this inconvenience one appeals to the use of inertial disks or wheels that, however, are not capable of providing the entire energy absorbed due to the "grounding" effect suffered by the bearings of the crankshaft seats.

To increase the regularity of the cycle, the number of cylinders in the engine should be increased, which also increases the complexity, friction, weight, volume and cost. Also, as crankshafts of large dimensions are required, the inertial masses also increase, contributing negatively to the final performance.

BRIEF SUMMARY OF THE INVENTION

From the above-mentioned, the technical necessity of developing a system to transform a reciprocating lineal motion into a rotating motion that helps to solve the previously mentioned problems is evident. The invention is based on the acknowledgment that a motion transformation system should include the following principles:

provide a small angle of incidence in the turning organs with regards to the lineal displacement of the cylinders;
reduce the number of cylinders, for example, two and obtain a complete regular cycle;
reduce the quantity of inertial masses; and
minimize the grounding effect.

According to the invention, this task is achieved according to the characteristics of claim 1, for which said system includes:

a hollow cilynder (2) lineally moveable, suitably lightened, in the side surface of which is provided a first blind groove (3) with a development in a closed zigzag or with a great number of rounded peaks (3a) and valleys (3b) and straight portions (3c), as well as some second straight blind grooves (4) that extend parallel to the axis (2a) of said cylinder from the proximity of its ends (2b, 2c) to the valleys (3b) of the zigzag that forms the first groove (3), that is to say in a number double to that of the peaks (3a) existing in an end of the grooved cylinder (3);

a piece of revolution in the form of a double crown (5) to coaxially accommodate in its inside the grooved cylinder (2) with two approximately equal portions (5a, 5b), each one having a double trunk-conical end piece (6) and a hollow cylindrical neck (7), connected to each other by means of assembly screws (T), where in the inner wall of the connection area of the cylindrical necks (7) provided in a circumference with the same angular separation is a first group of housings (8) complementary to the first groove (3) mentioned, anticipating in only one of the trunk-conical end pieces (6) a dentation (6a) of a indented crown; and where on the surface of the external bases of the mentioned trunk-conical pieces end (6) additionally provided as a circumference is a second group of housings (9) anglewise equidistant;

a pair of guide cylinders (10, 11) lineally faced inside of which the respective pistons (12, 13) of the ends (2b, 2c) of the grooved cylinder (2) move, and which constitute the inlet/outlet of lineal motion;

a crankcase (14) for the assembly of the cylinder set of grooved/double crown/guide cylinders, with crankcase covers (14a, 14b), in each one of which a third group of housings is provided (15) anglewise equidistant complementary to the second straight grooves (4), as well as a third circular groove (16) complementary to the housings (9) of the external bases of the mentioned trunk-conical end pieces (6);

sets of bearing balls (B1) mounted between the grooves (3, 4) of the grooved cylinder (2) and the mentioned first and third group of complementary housings (8, 15), as well as another set of bearing balls (B2) mounted between the second group of housings (9) and the third complementary circular groove (16); and a pair of trunk—conical pinions (P) that gear in the indented portion (6a) of the corresponding end piece (6) of the indented crown that constitute the rotating inlet/outlet of the system and that are mounted on the crankcase (14) in a well-known form.

According to an additional characteristic, conforming to the invention, in accordance with claim 2, the groove in zigzag (3) is provided so that the respective projections (A, B) of its rounded sections of peaks and valleys (3a, 3b) and its straight sections (3c) on perpendicular of the axis (2a) of the grooved cylinder (2), are in a (B/A) relationship preferably greater than 1; the ($\alpha$) angle formed by its straight sections (3c) and with regards to the axis (2a) of the grooved cylinder (2) being preferably smaller than 22°.

According to the invention, conforming to claim 3, it is a specially favorable embodiment when the groove in a closed zigzag (3) has four "peaks" (3a) and four "valleys" (3b) in each end of the grooved cylinder (2) and appropriately are provided a total of eight straight grooves (4) to provide a specially effective operation of the motion transformation system.

According to an additional characteristic of the invention, conforming to claim 4, it is a specially advantageous embodiment, when the grooves (3, 4, 16) are shaped with an approximately semi-circular cross section, the housings (8, 9, 15) being shaped in almost semi-spherical form.

To diminish the friction of the bearing balls (B1), the grooves (3, 4, 16) and housings (8, 9,15) can be shaped with the characteristics according to claims 5 to 7.

Additionally, it can be advantageous if the set formed by the second group of housings (9), the third circular groove (16) and the bearings (B2) is substituted by well-known balls crown.

According to another aspect of the invention, it would be a specially advantageous embodiment, when:

on the one hand, in the hollow cylinder, the straight groove is replaced by other blind groove/s in zigzag similar to the first groove in zigzag, so that now in the hollow cylinder at least two similar blind grooves are foreseen with a development in closed zigzag or a great number of rounded peaks and valleys that extend separated at a distance in the direction of the cylinder axis;

and on the other hand, the turning revolution piece is replaced by two revolution pieces, each one formed by an end piece and a cylindrical neck or ring connected by assembly screws to constitute a solidary whole that can rotate one regarding the other in opposite directions through a bearings crown coaxial to the grooved cylinder, where in the inner walls of each rotating piece housings are configured distributed at a circumference with the same angular separation that are complementary to the respective groove in zigzag and that serve for the respective bearing sets; also, to allow the rotating movement of each revolution piece in relation to the respective crankcase cover, a crown of bearings is foreseen coaxial to the grooved cylinder that is inserted in the respective grooves and are correspondingly foreseen in the revolution piece and crankcase cover associated to it.

A preferred embodiment of the invention results when in the grooved cylinder two grooves in zigzag are foreseen, with the complementary housings for the bearings of each rotating piece of revolution provided in the area of connection between the respective end pieces and rings.

Nevertheless, it is also an advantageous embodiment when in the grooved cylinder are foreseen four grooves in zigzag associated two by two to complementary housing pairs correspondingly provided inside each rotating piece.

In accordance to an additional aspect of the invention, the grooves and housings of the rotating pieces of revolution have complementary semi-rectangular cross sections and the bearings that lie between these grooves and housings are foreseen as cylindrical bodies with rounded bases.

Even according to another aspect of the present invention, a specially preferred embodiment results when the housings of the revolution pieces and the complementary grooves of the hollow cylinder where the corresponding sets of spherical bearings are housed, have a symmetrical cross section formed by two equal circumference arcs connected to each other by an intermediate polygonal line, where the radii of both arcs are similar to the radius of the bearing to house, their strings also being essentially similar to this radius and where the centers of these arcs are above the separation line between the surfaces of the grooved cylinder and of the respective piece of turning revolution and separated in a small measure or eccentricity.

Also according to another aspect of the invention, when polygonal cross section housings and grooves are used it is possible to use bearing elements formed by a wheel portion and a solidary whole or not shaft portion that are supported in the groove and/or in the respective housing, and both may be assisted by means of other supplementary bearings.

BRIEF DESCRIPTION OF THE DRAWINGS

Other characteristics and advantages of the invention will be more clear from the following description carried out with the help of the attached drawings, relating to a non-limiting execution example and where:

FIG. 5 illustrates a flat development of the groove in zigzag 3 for an embodiment with four peaks and four valleys in each end of the grooved cylinder, to illustrate the geometry of this groove in zigzag.

FIGS. 12A to 12C show alternative embodiments for the configuration of the grooves, housings and bearings.

DETAILED DESCRIPTION OF THE PREFERRED EMBODIMENT AND BEST MODE OF THE INVENTION

Figure 1:
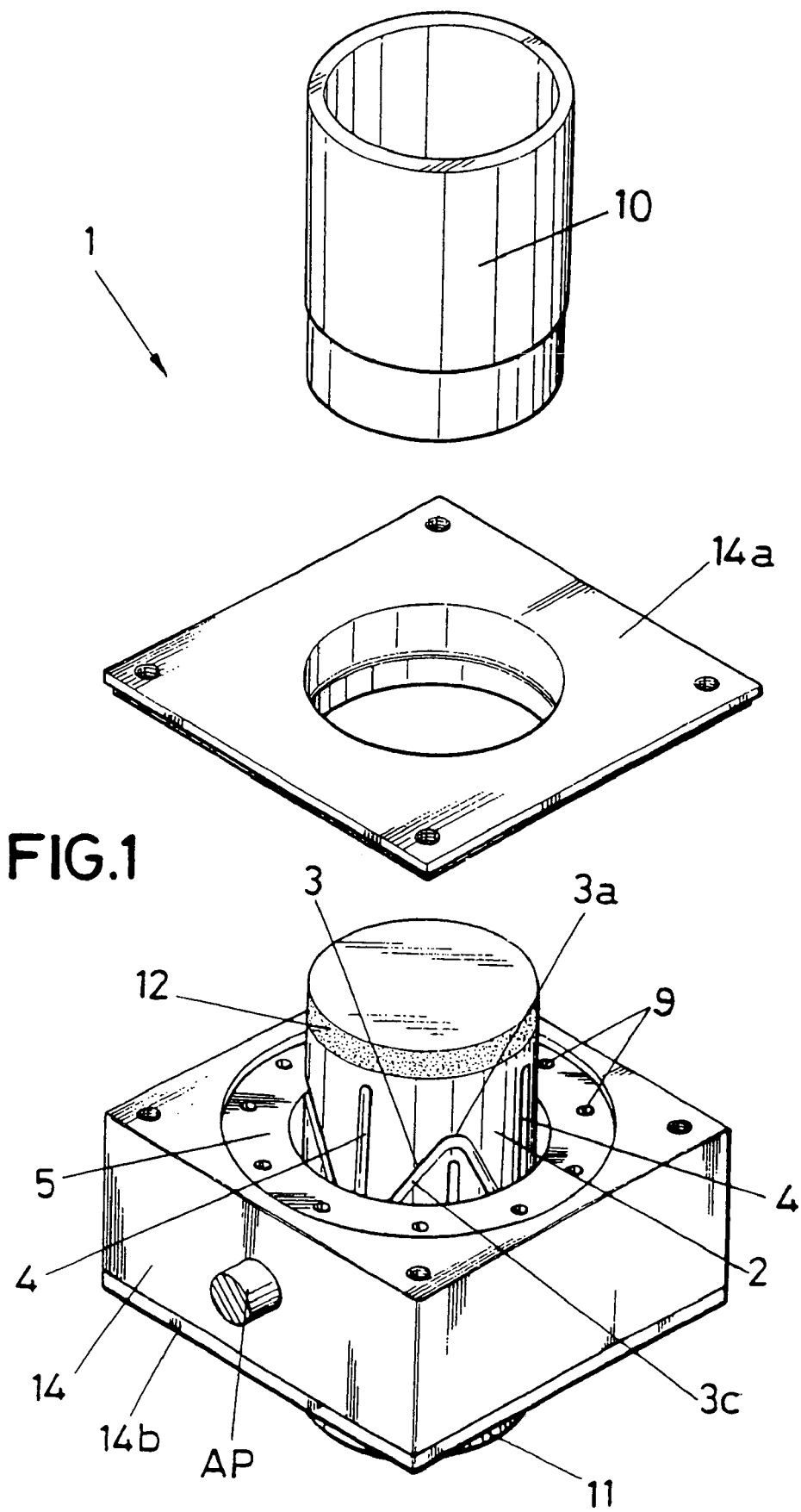
FIG. 1 represents in a schematic way a perspective view of the system according to the invention.

With regards to the figures, it can be seen that the motion transformation system, generally designated with the numeric reference 1, includes a grooved cylinder 2, hollow and suitably lightened, in the side surface of which is provided a first groove 3 development in a closed zigzag or with a great number of rounded peaks 3a and valleys 3b and straight portions 3c; as well as some straight grooves 4 that extend parallel to axis 2a of the grooved cylinder 2 from the proximity of its ends 2b, 2c, to the valleys 3b of the groove in zigzag 3, that is to say provided in a number double to that of the peaks 3a or valleys 3b provided in an end of the grooved cylinder 3. According to the invention the groove in zigzag 3 has, at least, three "valleys" 3a and three "peaks" 3b in each end of the grooved cylinder surrounded by six straight grooves 4; however, a favorable embodiment is with four peaks and valleys 3a, 3b for each end of the grooved cylinder and a total of eight straight grooves 4. Coaxial to this grooved cylinder 7, embracing it, provided for rotating is a piece of revolution 5 with portions 5a, 5b, each one of which is constituted by a double trunk-conical end piece 6 and a hollow cylindrical neck 7 that can be mounted firmly to each other to form an inseparable whole by means of assembly screws T. As can be seen with more detail in FIG. 4, in the connection area of the necks 7 provided as a circumference is a first group of housings 8, four in this case, of a complementary configuration to the first groove in zigzag 3 and with the same angle separation, 90°, for a first set of bearing balls B1 as will be explained later in detail; also, in the upper or external base of each of the end pieces 6, is provided a second group of housings 9 anglewise equidistant, for another set of bearing balls B2 as will also be explained later in detail.

Additionally, in only one of the end pieces 6 is provided an indented portion 6a determining an indented crown to gear with each conical pinions P whose shafts AP constitute the rotating exit of the system as will be explained later.

The grooved cylinder 2 is mounted to move by means of its pistons 12, 13 through two guide cylinders 10, 11 that make up the lineal inlet motion.

To assemble this group a crankcase 14 is provided with some crankcase covers 14a, 14b for closing the set and in each one of which a third group of housings 15 is provided anglewise equidistant and complementary to the straight grooves 4 to accommodate, between both, another set of bearing balls B1. Additionally, in each one of these crankcase covers 14a, 14b, a third circular groove 16 is provided, complementary to the second group of housings 9 of the external bases of the end pieces 6, and which are assigned to accommodate another set of bearing elements B2.

As can be clearly appreciated in FIG. 5, the groove in zigzag 3, in this case with four peaks 3a and valleys 3b on each end of the grooved cylinder 3, is provided so that the projections A and B in its rounded sections of peaks 3a and valleys 3b and in its straight sections 3c on perpendicular to the axis 2a of the grooved cylinder 2, are in a B/A relationship preferably greater than 1; the angle formed by its straight sections 3c and with regards to the axis 2a of the grooved cylinder 2 preferably being smaller than 22°. So that the transformation system according to the invention is especially effective, the following relationship should take place:

Π.$h/n$.<1 where, h=projection on the axis 2a of the distance between centers between consecutive peaks 3a in the course of motion;

n=total number of peaks 3a of the groove 3; and

L=distance or separation between straight grooves 4.

According to the invention a specially advantageous embodiment is when the grooves 3, 4 and 16 are shaped in an approximately semi-circular cross section, and the housings 8, 9 and 15 are shaped in almost semi-spherical form. Nevertheless, for those cases with high requirements of reduced friction, the grooves 3, 4, 16 and housings 8, 9, 15 can be shaped, in a reciprocating manner according to what is represented in FIGS. 6A to 6C.

Figure 6A:
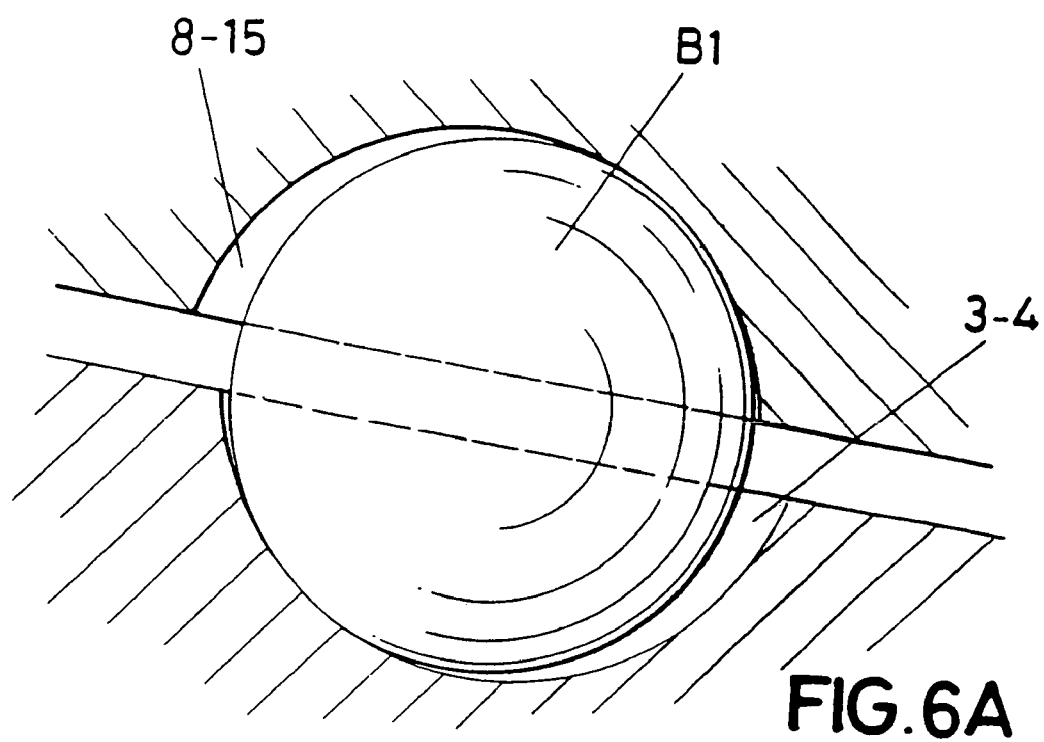
FIGS. 6A to 6C show alternative embodiments for the configuration of grooves and housings for the bearing elements.
Figure 6B:
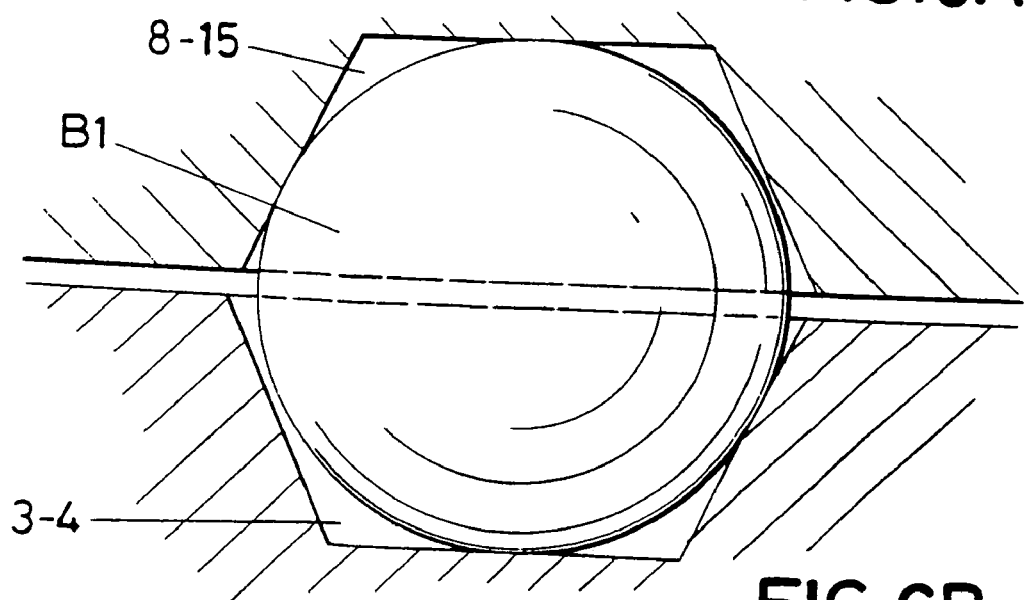
Figure 6C:
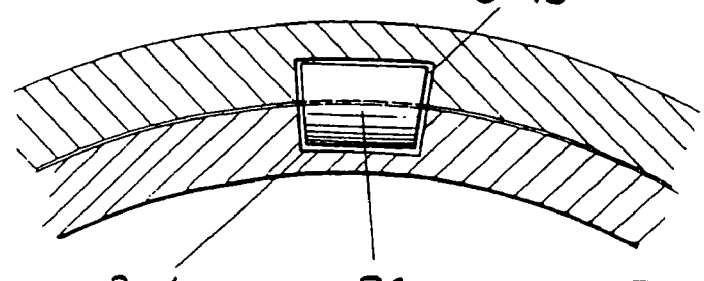

As shown in FIG. 6A, the housings are shaped as spherical caps some smaller than 180° and the grooves of almost semi-circular cross section are slightly eccentric, that is to say slightly displaced with regards to the bearing turn; but also, as shown in FIG. 6B, the housings can be shaped as polyhedric caps also smaller than 180° and the grooves with an also semi-polygonal complementary cross section and slightly eccentric or displaced in relation to the turn of the corresponding bearing; or even as housings and grooves of a trapezoidal cross section as illustrated in FIG. 6C, in this case the bearing element accordingly being trunk-conical.

Additionally, it can be advantageous if the set formed by the second group of housings 9, the third groove 16 and the bearings B2 is substituted by balls crown (not shown).

As will be appreciated by those skilled in the art, a system according to the previously described has an operation in accordance to the following.

the pistons 12, 13, mounted on the ends of the grooved cylinder 2, and which constitute the inlet of the reciprocating lineal motion to be transformed, move through the inside of the guide cylinders 10, 11, dragging this grooved cylinder 2 with their reciprocating lineal motion;

the reciprocating lineal motion of the grooved cylinder 2 is transmitted to the double crown piece 5 through the coupling formed by the set of grooves in zigzag 3, housings 8 of neck 7 and bearing balls B1, so that this double crown piece is pushed to rotate around the axis 2a of the grooved cylinder 2 supported on the bearings B2 placed between the second group of housings 9 in the external base of the end piece 6 and the third circular groove 16 of each crankcase cover 14a, 14b; also the grooved cylinder 2 has a turning motion impeded around its axis 2a due to the coupling existing between its straight grooves 4, the other set of bearing balls B1 and the third group of housings 15 of the crankcase covers 14a, 14b;

the indented portion 6a in one of the end pieces 6 of the double piece crown, in its turning motion around axis 2a of the grooved cylinder 2 drags the pinions P whose shafts AP constitute the rotating exit of the transformation system.

According to the invention, as may be required by system parameters, in the shafts AP of the pinions P, inertial wheels or disks M are provided, but with a reduced mass in comparison to those required in a conventional system, due to the special geometry of the groove in zigzag 3 of the grooved cylinder 2.

As will be appreciated by those skilled in the art, the force exercised by the grooves in zigzag 3 through the bearing balls B1 is applied to the rotating double crown piece 5 under a constant angle, except in the transition points of the peaks 3a, so that it is applied evenly and efficiently in almost the entire path of the pistons, providing a regular and standard course.

Figure 7:
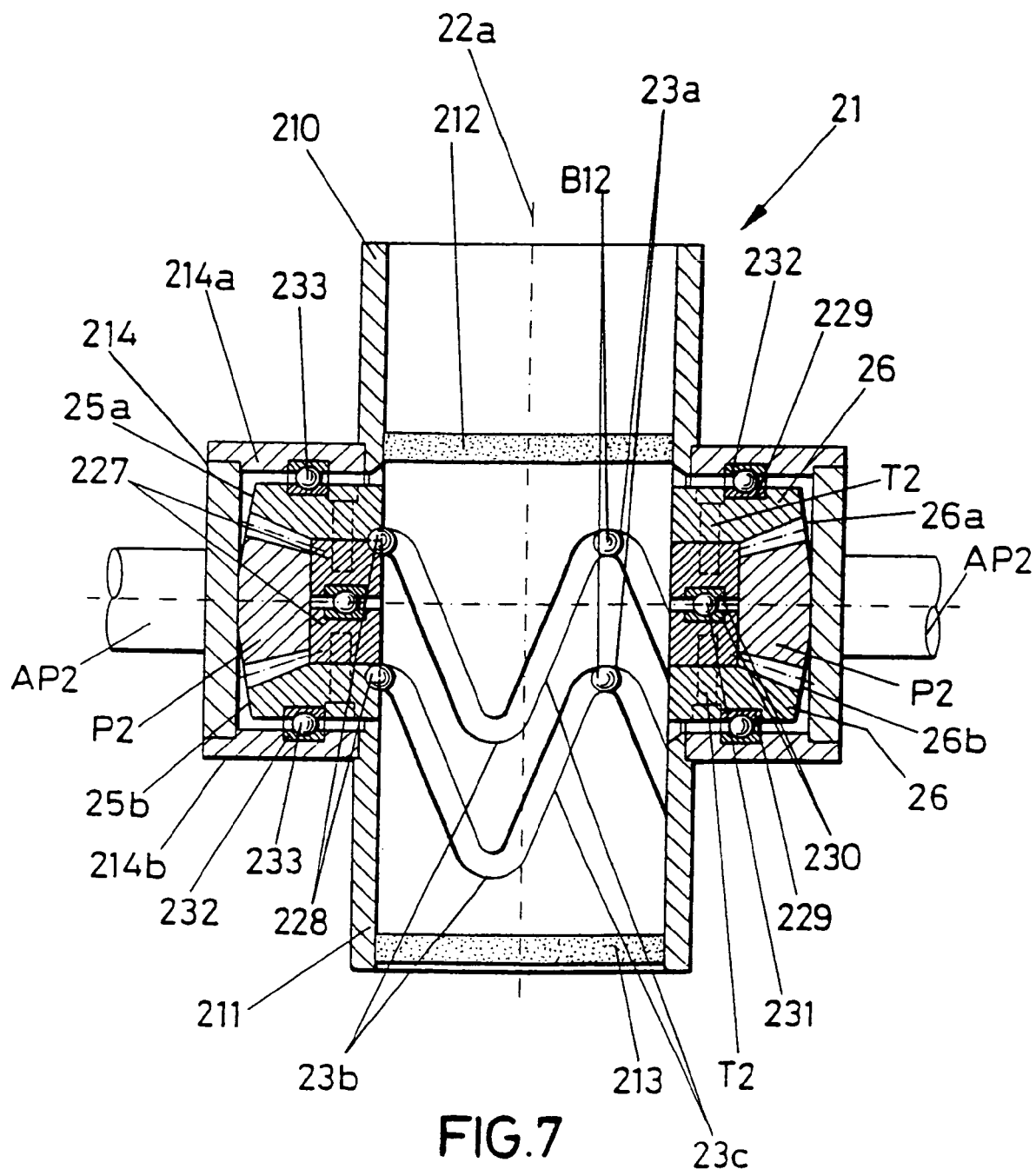
FIG. 7 shows in a schematic way a partial cross section view of a first embodiment of the motion conversion system.
Figure 8:
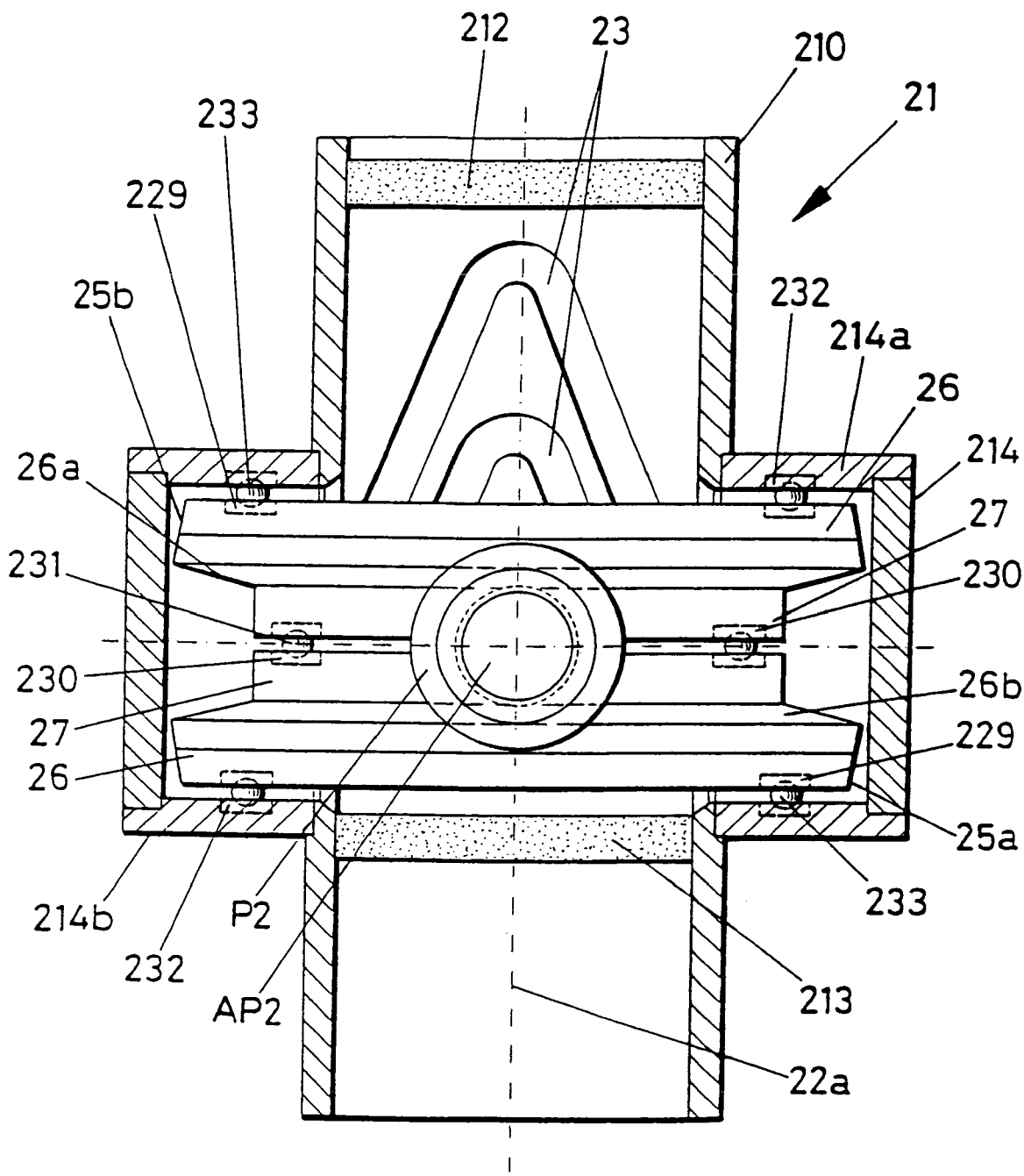
FIG. 8 illustrates a similar view to that of FIG. 7 but rotated 90°.
Figure 9:
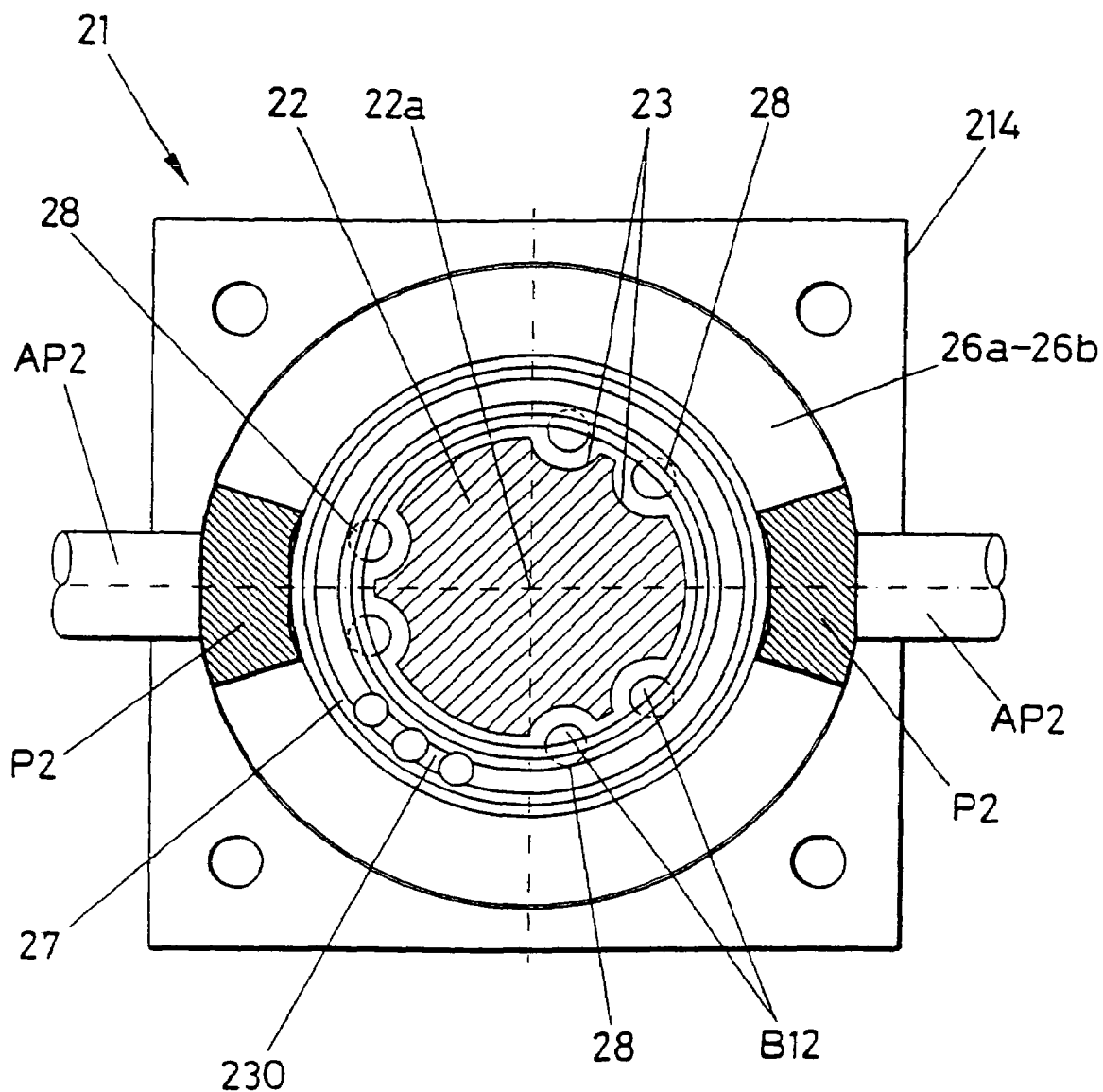
FIG. 9 shows a top view of a detail of the inside of the system according to FIG. 7, referring to an embodiment of the groove in zigzag with three peaks on each end of the grooved cylinder.

In reference to FIGS. 7 to 9 it is possible to see that the motion transformation system, in general designated with the numeric reference 21, includes a grooved cylinder 22, hollow and suitably lightened, in the side surface of which two grooves 23 are foreseen of a same development in a closed zigzag or with a great number of rounded peaks 23a and valleys 23b and straight portions 23c.

Each one of these two grooves in zigzag 23 have at least three "valleys" 23a and three "peaks" 23b in each end of the grooved cylinder 22. These grooves are located displaced regarding axis 22a of cylinder 22 so that each pair of respective homologous points H1, H2 are located in the same line parallel to this axis 22a, with the external edges of the exterior curved sections of each groove at the same distance D from the respective end of the grooved cylinder 22.

Coaxially to this grooved cylinder 22, embracing it, are two pieces of revolution 25a and 25b with turning foreseen, each one of which is constituted by a trunk-conical end piece 26 and a hollow or ring cylindrical neck 27. Each end piece 26 is fastened to its respective ring pair 27 by means of assembly screws T2 to configure each one of the pieces 25a and 25b as a solidary whole.

As may be appreciated with more detail in FIGS. 7 and 9, in the inner part of the area of connection between the respective end piece 26 and the ring 27 are foreseen in circumference groups of housings 28, three in this case, of complementary configuration of the associated groove in zigzag 23 and with same angular separation, 120°, for a set of bearings B12 as will be explained in detail later on. Also, in the top or external base of each one of these end pieces 26, concentric to the axis 22a, a circular groove 229 is foreseen, of a polygonal section, preferably rectangular.

Also in the opposite bases of the rings 27 are foreseen respective grooves 230, 230 of semi-polygonal section, preferably rectangular that cooperate mutually to fittingly house a bearings crown 231 and allow the relative turn of the respective rotating pieces 25a and 25b.

Additionally, in the end pieces 26 are foreseen respective indentations 26a and 26b determinant of indented crowns to gear with all conical pinions P2 whose shafts AP2 constitute the rotating exit/entry of the system as will be explained later on.

The grooved cylinder 22 is mounted to move by means of its pistons 212, 213 through all guide cylinders 210, 211 that make up the lineal inlet/outlet motion.

For the assembly of this group, a crankcase 214 is foreseen with some crankcase covers 214a, 214b to close the group and in each one of which is foreseen concentric to the axis 22a a cooperating circular groove 232 and complementary to groove 229 of the respective end piece 26 to house, between both, another bearings crown 233.

Figure 10:
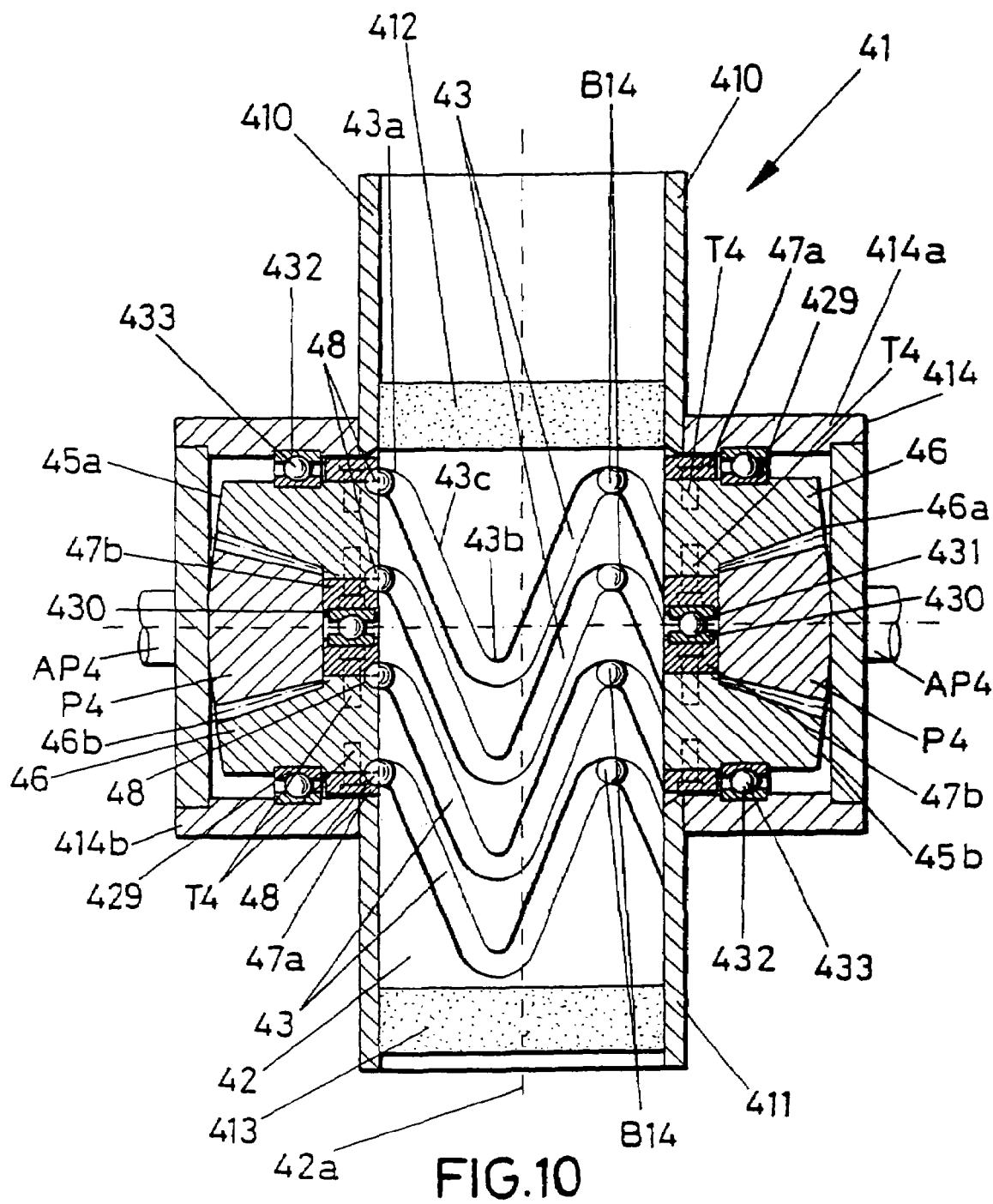
FIG. 10 shows another embodiment of the motion transformation system with four grooves in a partial cross section view.
Figure 11:
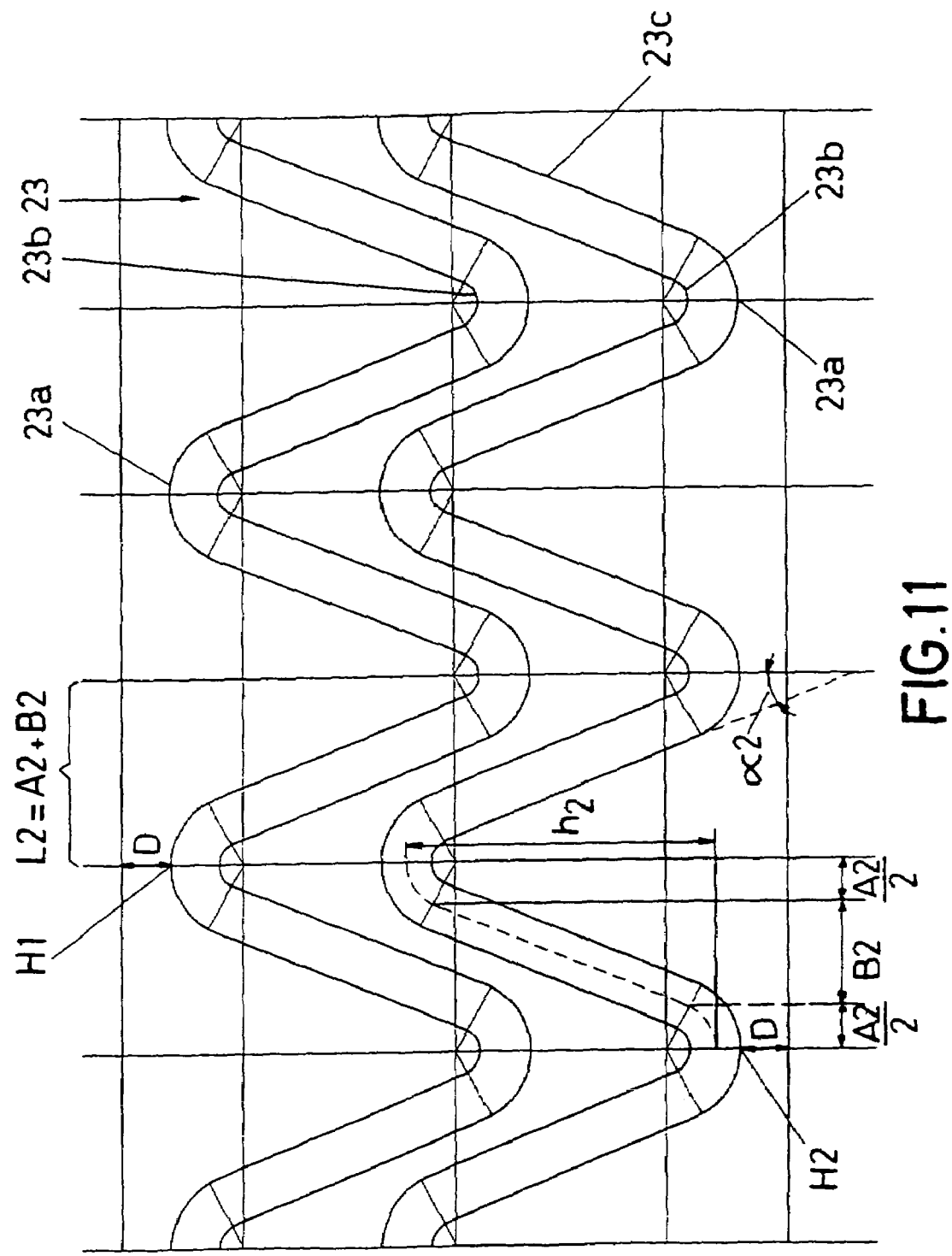
FIG. 11 illustrates a flat development of the side surface of the grooved cylinder of the system according to FIG. 7, with the pair of grooves in zigzag for an embodiment with three peaks and three valleys in each end of the grooved cylinder.

In FIG. 10, a motion transformation system is represented, in general indexed with 41 that differs from the system according to FIGS. 7 to 9 only in that here the grooved cylinder 42 is foreseen with four blind grooves in zigzag 43 associated two by two with housing pairs 48 correspondingly foreseen in the inner part of each rotating piece 45a and 45b; each one of these rotating pieces 45a, 45b formed here by an end piece 46, an external ring 47a and an inner ring 47b.

Figure 4:
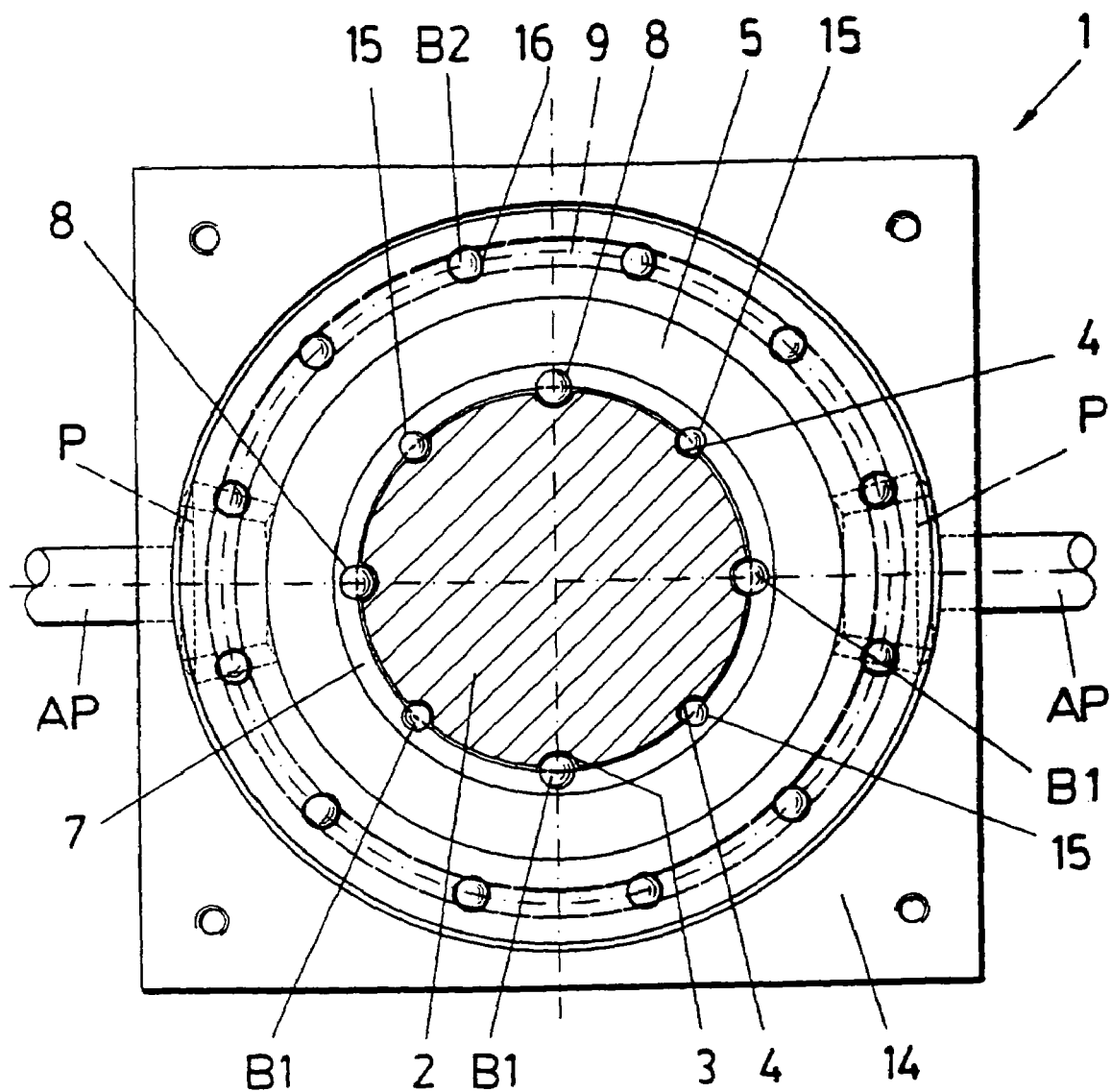
FIG. 4 shows a top view of a detail of the inside of the system according to FIG. 1, referring to an embodiment of the groove in a zigzag with four peaks in each end of the grooved cylinder.

The remaining parts of this system are similar to that previously explained for FIGS. 7 to 9, so it is not necessary to describe them again in detail, but the similar elements may be identified in FIG. 4 according to the following list of references:

| | |
|---|---|
| 41. | Motion transformation system; |
| 42. | Grooved cylinder; |
| 42a. | Grooved cylinder axis 42; |
| 43. | Grooves in zigzag; |
| 43a. | Peak grooves 43; |
| 43b. | Valley grooves 43; |
| 43c. | Straight section grooves 43; |
| 45a-45b. | Rotating revolution pieces; |
| 46. | Trunk-conical end pieces of the pieces of revolution 45a, 45b; |
| 46a-46b. | Gear indentations of the end pieces 46; |
| 47a-47b. | Rings of the revolution pieces 45a, 45b; |
| 48. | Housings for bearings; |
| 410-411. | Guide cylinders; |
| 412-413. | Pistons of the grooved cylinder 42; |
| 414. | Crankcase; |
| 414a-414b. | Crankcase covers |
| 429. | Grooves of the ends piece bases 46; |
| 430. | Grooves of the ring bases 47b; |
| 431. | Bearings crown for the rings 47b; |
| 432. | Grooves of the crankcase cover bases 414a-414b; |
| 433. | Bearing crowns for the rotating revolution pieces 45a, 45b and the crankcase covers 414a, 414b; |
| B14. | Bearings; |
| P4. | Trunk-conical pinions; |
| AP4. | Pinion shafts P4; |
| T4. | Assembly screws; |

As shown in a specially clear way in FIG. 1, each groove in zigzag 23, in this case with three peaks 23a and valleys 23b for each end of the grooved cylinder 22, is provided so that the projections A2 and B2 of its rounded sections of peaks 23a and valleys 23b and its straight sections 23c on the perpendicular of the axis 22a of the grooved cylinder 22, are in a B2/A2 relationship preferably greater than 1; with the angle α2 formed by its straight sections 23c regarding the axis 22a of the grooved cylinder 22 preferably smaller than 25°.

So that the transformation system according to the invention is especially effective, the following relationship should be completed:

$$\Pi.h2/n2.L2<1$$

where, h2=projection on the axis 22a of the distance between centers between consecutive peaks 23a in a course of notion;

n2=total number of peaks 23a of the groove 23; and

L2=distance or separation regarding the perpendicular to the axis 22a between the centers of two peaks 23a in a course of motion.

Figure 2:
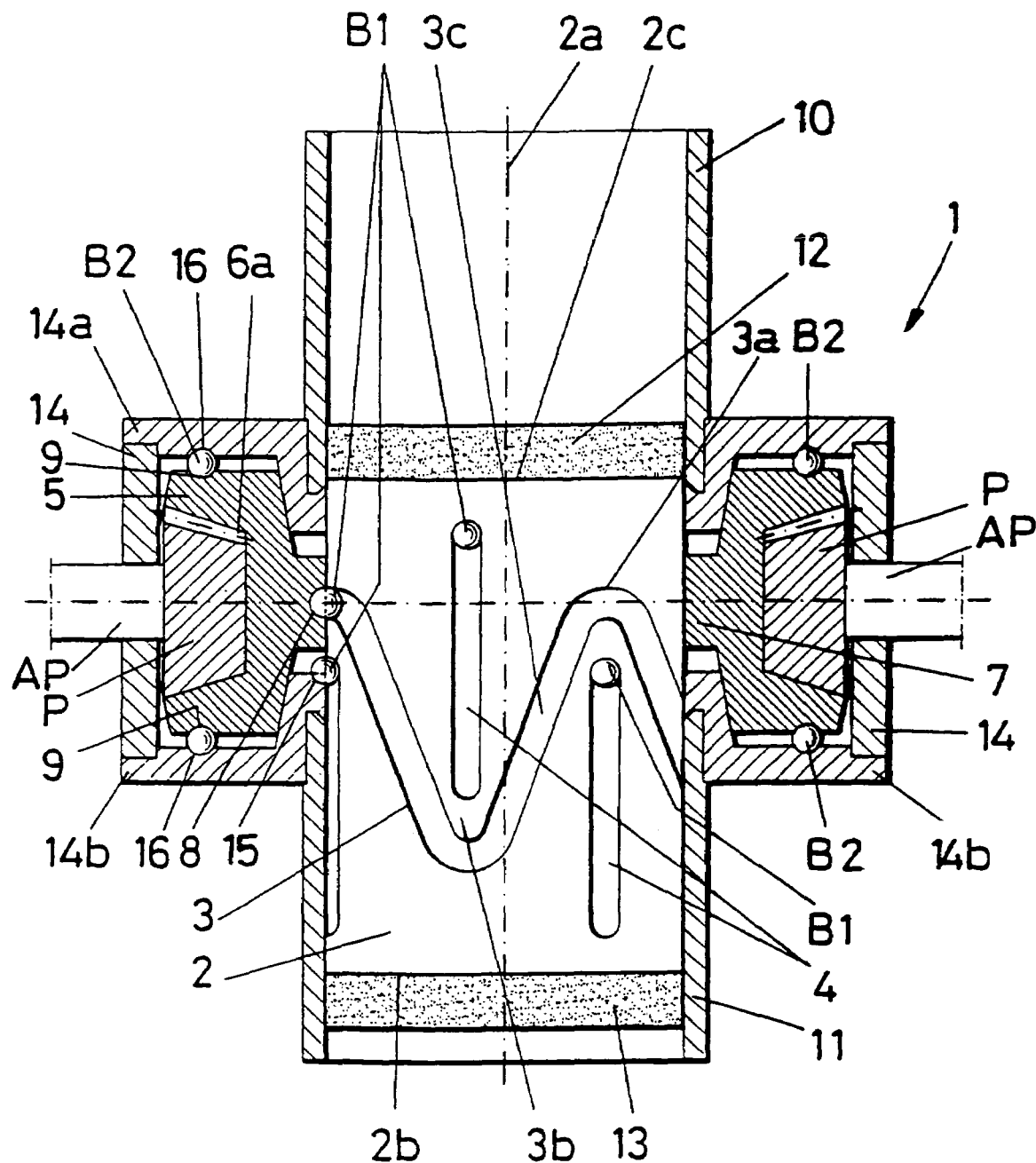
FIG. 2 also shows in a schematic way a partial section view of FIG. 1.
Figure 3:
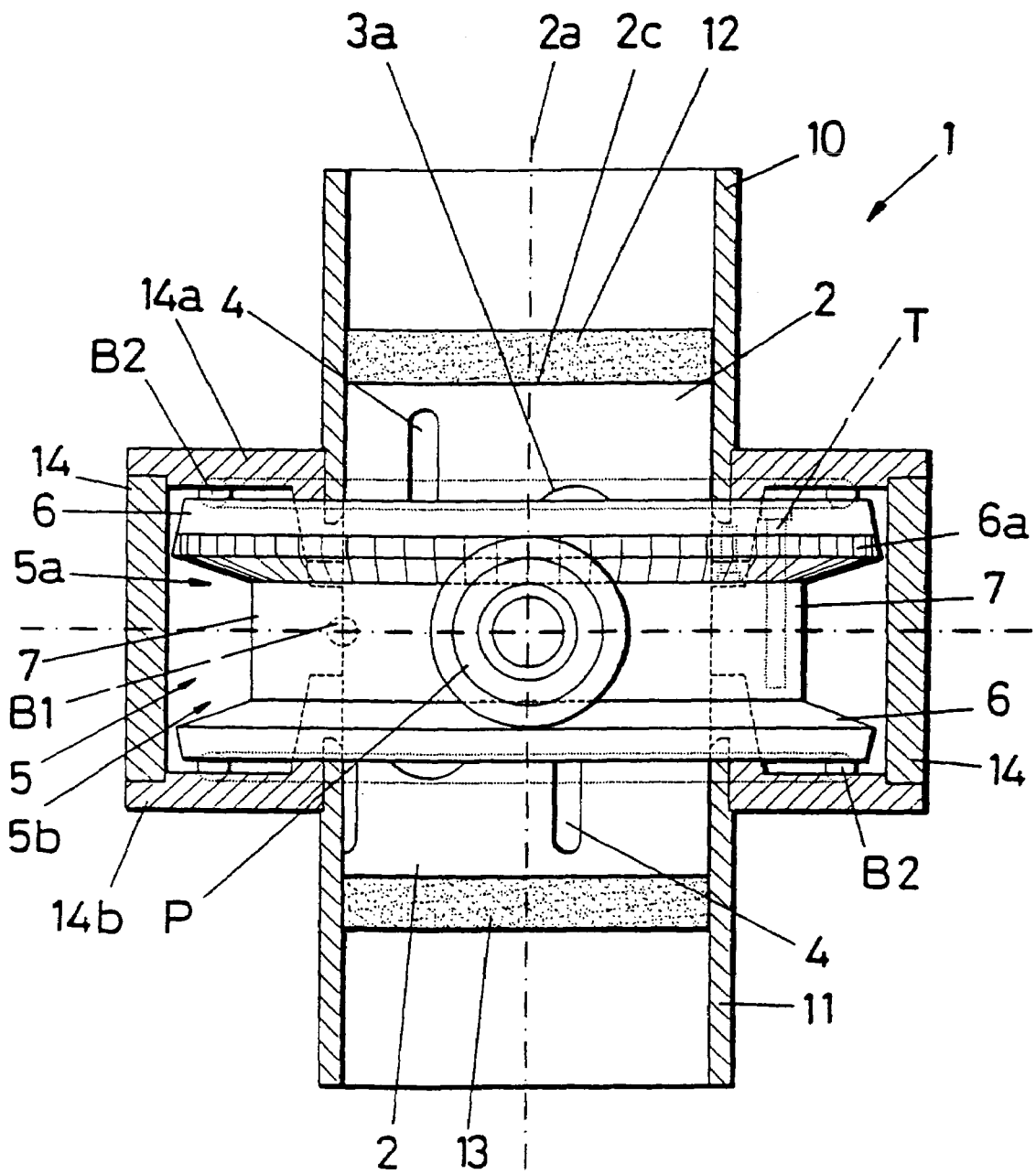
FIG. 3 illustrates a similar view to that of FIG. 2, but rotated 90°.

Even when the flat development of the grooved cylinder 42 is not represented according to the alternative motion transformation system 41 according to FIG. 10, that previously mentioned for grooves 23 of the system 21 according to FIGS. 1 to 3 is equally applicable to each pair of grooves 43 of the grooved cylinder 42, so that it is not necessary to repeat these here again.

Figure 12B:
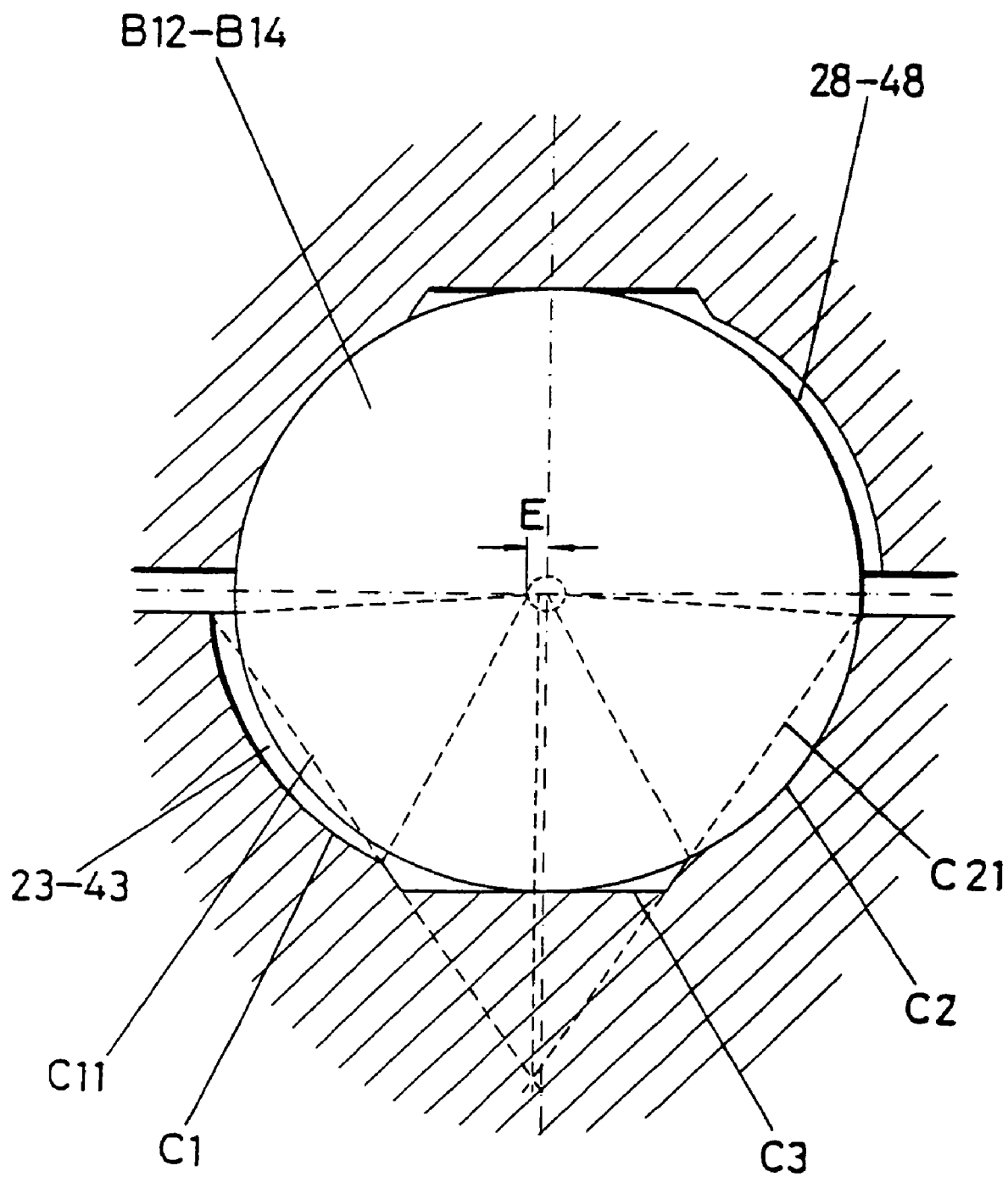
Figure 12C:
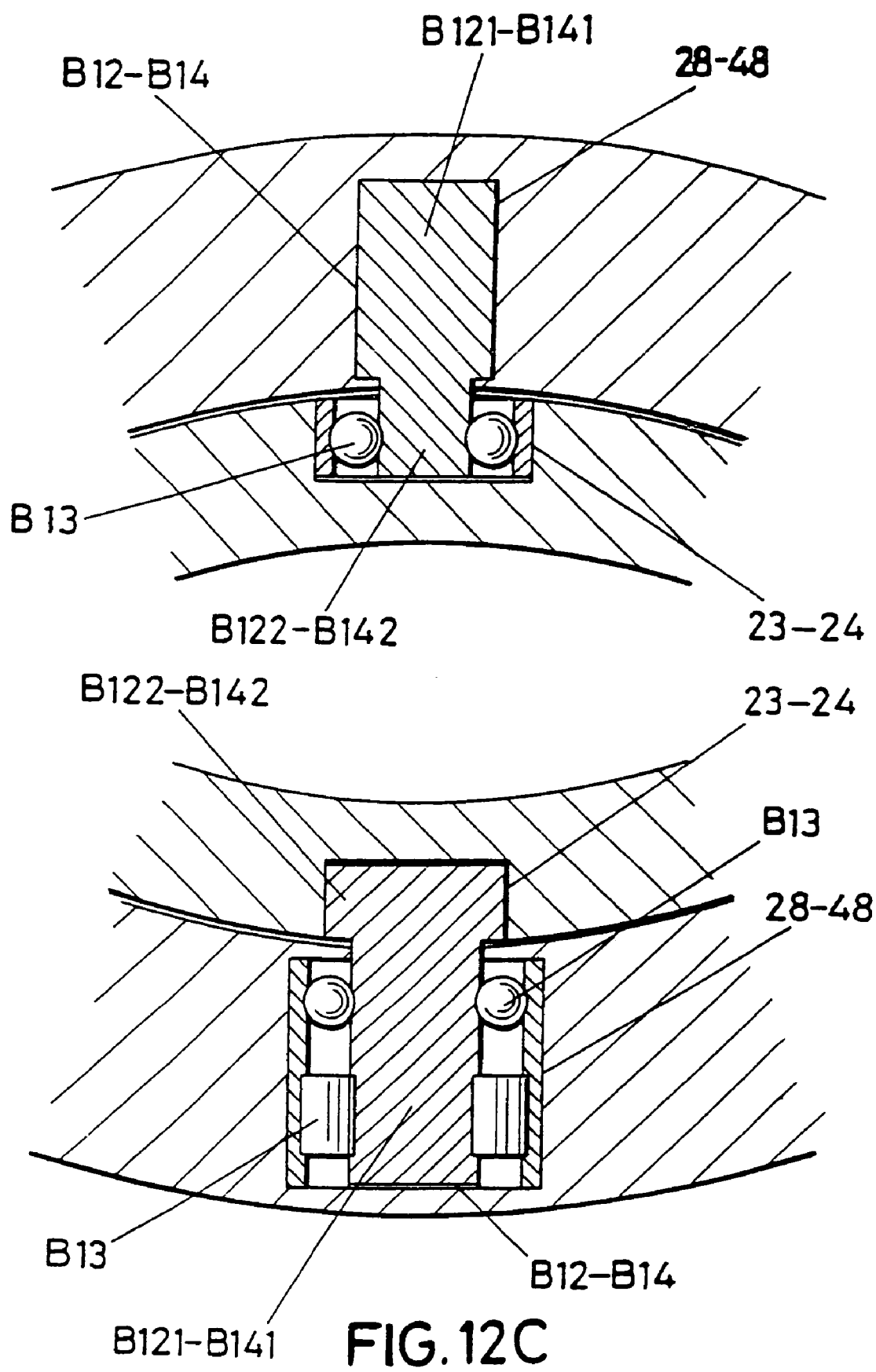

According to the invention, it is a specially advantageous embodiment when the grooves 23, 43 and the housings 28, 48, are configured as represented in FIGS. 12A to 12C.

As shown in FIG. 12A, the grooves 23, 43 and the housings 28, 48, have a semi-rectangular cross section and the bearings B12, B14 are foreseen as cylindrical bodies with rounded bases that lie housed between these grooves and housings.

FIG. 12B shows a specially favorable configuration of the grooves 23, 43 and of the housings 28, 48. Here, the cross section is symmetrically defined by two circular arcs C1, C2, connected to each other through an intermediate polygonal line C3; the circular arcs C1, C2 are slightly eccentric in the measure E and they have a radius similar to the radius of the bearing B12, B14 to house and sustain strings C11, C21 essentially similar to its radius, that is to say to the radius of bearing B12, B14; the centers of the arcs C1, C2 are on the half line of separation between the respective surfaces of grooved cylinder and revolution piece.

FIG. 12C shows an alternative configuration of the bearings B12, B14 that is used when the grooves 23, 43 and the housings 28, 48 have a polygonal configuration but of a different extension.

Here, the bearing B12, B14 is formed by a first cylinder B121, B141 and a second cylinder B122, B142 of a different diameter that can be solidary to each other or relatively turning supported on the grooves 23, 43 and housings 28, 48, and they can both be assisted by means of supplementary bearings B13.

As will be appreciated by the those skilled in the art, the systems according to the previously described operate according to the following.

the pistons 212-213, 412, 413 mounted firmly on the ends of the cylinder of the grooved cylinder 22, 42, and that constitute the entry of the alternative lineal motion to transform, move through the inside of guide cylinders 210-211, 410-411 accompanying to this grooved cylinder 22, 42 in its alternative lineal motion;

the alternative lineal motion of the groove cylinder 22, 42 is transmitted to the rotating pieces 25$^a$-25b, 45a-45b through the coupling formed by the group of grooves in zigzag 23, 43 and housings 28, 48 of these rotating pieces 25a-25b, 45a-45b and bearings B12, B14, so that these rotating pieces 25a-25b, 45a-45b are driven to rotate in opposite directions around the axis 22a, 42a of the grooved cylinder 22, 42 supported on the bearings crown 231, 431 provided between both and the bearings crowns 233, 433 foreseen between each rotating piece 25a-25b, 45a-45b and the respective crankcase cover 214a-214b, 414a-414b; also, the grooved cylinder 22, 42 has a turning motion impeded around its axis 22a, 42a by virtue of the rotation in opposing turning directions of the rotating pieces 25a-25b, 45a-45b that are balanced when producing turning moments of similar rotations and of opposite directions;

the indented portions 26a-26b, 46a-46b of the rotating pieces 25a-25b, 45a-45b, drag in their turning motion around the axis 22a, 42a of the grooved cylinder 22, 42 the pinions P2, P4 whose shafts AP2, AP4 constitute the rotating exit of the transformation system 21, 41.

A system according to the aforementioned has an application in all machinery types and engines, regardless of the type of operation, whether it is by steam, pneumatics, explosion, etc.

As will be appreciated by those skilled in the art, the transformation system according to the previously described, could be used with hardly any variations in a so-called "inverse" manner, that is to say to transform a turning motion, now applied through the pinions P, into a reciprocating rectilinear motion of the grooved cylinder 2 and of its associated pistons 12, 13 that could be useful in the operation of machines, tools with a reciprocating motion, such as planing machines, hammers, compressors and depressors, etc., and in general, in all types of mechanisms that use a connecting rod-handle system.

As such object of the invention has been sufficiently described, only left to indicate that the resulting realizations of changes in shape, dimensions, and similar, as well as those derived from an application of routine from the previously exposed, must be considered included in its boundary so that the invention will be only limited by the scope of the following claims.

The invention claimed is:

1. A system for the conversion of a rectilinear swaying motion into a rotating motion and vice versa, with an inlet/outlet of lineal motion through pistons (212, 213; 412, 413) and a turning outlet/inlet comprised of shafts (AP2; AP4) and pinions (P2; P4), comprising:

a hollow cylinder (22; 42) lineally moveable in a side surface of which are provided blind grooves (23; 43) having a closed zigzag formed with a plurality of rounded peaks (23a; 43a) and valleys (23b; 43b) and straight portions (23c; 43c), displaced from each other so that each pair of homologous points (H1, H2) are located in the same line parallel to the axis (22a; 42a), with the points of inflection of the lines that form the external edges of the external rounded sections at the same distance (D) of the respective ends of the grooved cylinder (22; 42), where the pistons are positioned (212, 213; 412, 413);

two rotating revolution pieces each substantially shaped as a crown (25a, 25b; 45a, 45b) to coaxially accommodate the grooved cylinder (22; 42), each rotating piece having a trunk-conical end piece (26-26; 46-46) and rings (27; 47a-47b), connected to each other, wherein the inner wall of the rotating pieces (25a, 25b; 45a, 45b) includes a connection area between the end pieces (26-26; 46-46) and the rings (27-27; 47a-47b), and a plurality of housings (28; 48) complementary to the grooves in zigzag (23; 43), each end piece (26-26; 46-46) having an indentation (26a-26b; 46a-46b); and wherein on a surface of external bases of the end pieces (26-26; 46-46) are circular grooves (229-229; 429-429) concentric to an axis of the hollow cylinder (22a; 42a);

a pair of guide cylinders (210, 211; 410, 411) in which the respective pistons (212, 213; 412, 413) of the ends of the grooved cylinder (22; 42) move whereby providing the inlet/outlet of lineal motion;

a crankcase (214; 414) for the assembly of the grooved cylinder, the revolution pieces, and the guide cylinders, including crankcase covers (214a, 214b; 414a, 414b), in the inner base of the crankcase is a circular groove (232 232; 432 432) concentric to the axis (22a; 42a) that serves with the circular groove (229-229; 429-429) of the external bases of the respective piece of trunk-conical end (26-26; 46-46) to fittingly house a first bearings crown (233-233; 433-433) that allows the turn of the respective revolution piece (25a, 25b; 45a, 45b) in relation to the respective crankcase cover (214a, 214b; 414a, 414b);

bearings sets (B12; B14) mounted between the grooves (23; 43) of the grooved cylinder (22; 42) and the complementary housings (28; 48) of the rotating pieces of revolution (25a, 25b; 45a, 45b);

a second bearings crown (231; 431), fittingly displaced between circular grooves (230 230; 430-430) concentric to the axis (22a; 42a) correspondingly provided in the opposite faces of the rings (27 27; 47a 47b) to allow turning the rotating pieces of revolution (25a, 25b; 45a, 45b) in opposite directions; and a pair of trunk-conical pinions (P2, P4) that gear in the indentation (26a-26b; 46a-46b) of the corresponding end piece (26-26; 46-46) having shafts (AP2, AP4) that comprise the rotating exit/entry of the system (21,41) and that are mounted on the crankcase (214; 414).

2. A system according to claim 1, wherein the grooves in zigzag (23; 43) are provided so that the projections (A2, B2) of the rounded sections of peaks and valleys (23a, 23b; 43a, 43b) and the straight sections (23c; 43c) on perpendicular of the axis (22a; 42a) of the grooved cylinder (22; 42), are in a (B2/A2) relationship greater than about 1; the angle (α2) formed by their straight sections (23c; 43c) with regard to the axis (22a; 42a) of the grooved cylinder (22; 42) being preferably smaller than 25°, where the following relationship is fulfilled:

$$\Pi(h2)/(n2)(L2)<1$$

where, h2=projection on the axis (22a, 42a) of the grooved cylinder (22; 42) of the distance between the centers of two consecutive peaks (23a; 43a) in a course of motion;

n2=total number of peaks (23a; 43a) of the groove (23; 43); and

L2=distance or separation regarding the perpendicular to the axis (22a; 42a) between consecutive peaks (23a; 43a) in a course of motion.

3. A system according to claim 1 or 2, wherein the grooved cylinder (22) includes two grooves in zigzag (23), anticipating the complementary housings (28) in the area of connection between the end pieces (26-26) and the rings (27-27) of the rotating revolution pieces (25a, 25b).

4. A system according to claim 1 or 2, wherein the grooved cylinder (42) includes four grooves in zigzag (43) associated two by two with pairs of housings (48) in the inner part of each rotating piece of revolution (45a, 45b).

5. A system according to claim 1 or 2, wherein the grooves in zigzag (23; 43) of the grooved cylinder (22; 42) and the housings (28, 48) of the rotating revolution pieces (25a, 25b; 45a, 45b) have complementary semi-rectangular sections and the bearings (B12; B14) housed therebetween comprise cylindrical bodies with rounded bases.

6. A system according to claim 1 or 2, wherein the grooves in zigzag (23; 43) of the grooved cylinder (22; 42) and the housings (28, 48) of the rotating revolution pieces (25a, 25b; 45a, 45b) have mixed cross sections symmetrically defined by two circular arcs (C1, C2) connected to each other by an intermediate polygonal line (C3) and the circular arcs (C1, C2) are slightly eccentric in the measure (E) and have a radius similar to the radius of the bearing (B12; B14) to house and sustain respective strings (C11, C21); wherein, the centers of the arcs (C1, C2) are on a half line of separation between the respective surfaces of the grooved cylinder (22; 42) and the rotating pieces of revolution (25a, 25b; 45a, 45b).

7. A system according to claim 1 or 2, wherein the grooves in zigzag (23; 43) of the grooved cylinder (22; 42) and the housings (28; 48) of the rotating pieces (25a, 25b; 45a, 45b) have a polygonal configuration, each bearing (B12; B14) formed by a first cylinder (B121; B141) and a second cylinder (B122; B142) having a different diameter that can be solidary to each other or turning supported on the grooves (23; 43) and housings (28; 48).

8. A system according to claim 7, further comprising supplemental bearings (B13) for assisting the first and second cylinders.

* * * * *